United States Patent
Sharma et al.

(10) Patent No.: US 12,299,505 B2
(45) Date of Patent: May 13, 2025

(54) DECENTRALIZED FRAMEWORK FOR PROVIDING APPLICATION PROGRAMMING INTERFACE GATEWAYS

(71) Applicant: Dell Products L.P., Round Rock, TX (US)

(72) Inventors: Shailesh Sharma, Morris Plains, NJ (US); Ashok K. Muthukrishnan, Prosper, TX (US); Prathap Mare, Hyderabad (IN); Bharat Hegde K, Bangalore (IN); Anwesh Elisetty, Leander, TX (US); Venkata Satya Patelkhana, Round Rock, TX (US); Karthick Sundaresan, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 216 days.

(21) Appl. No.: 17/947,535

(22) Filed: Sep. 19, 2022

(65) Prior Publication Data
US 2024/0095099 A1    Mar. 21, 2024

(51) Int. Cl.
*G06F 9/54*       (2006.01)
*H04L 9/40*       (2022.01)
*H04L 67/60*      (2022.01)

(52) U.S. Cl.
CPC .......... *G06F 9/541* (2013.01); *H04L 63/0428* (2013.01); *H04L 67/60* (2022.05)

(58) Field of Classification Search
None
See application file for complete search history.

(56) References Cited

U.S. PATENT DOCUMENTS

2020/0068390 A1* 2/2020 Knapp ................. H04W 12/04
2022/0035689 A1* 2/2022 Raheja ................. G06F 9/5011

OTHER PUBLICATIONS

Broadcom Software, Layer7 API Gateway 10.1, "Install, Configure, Upgrade," Available at: https://techdocs.broadcom.com/content/dam/broadcom/techdocs/us/en/pdf/ca-enterprise-software/layer7-api-management/api-gateway/10-1/Layer7-api-gateway-10-1.pdf (Last accessed Sep. 16, 2022), Last Updated Aug. 23, 2022, pp. 152-296.
Kong Inc., "What is an API Gateway?", available at: https://konghq.com/learning-center/api-gateway/what-is-an-api-gateway, last accessed Sep. 16, 2022.

* cited by examiner

Primary Examiner — Craig C Dorais
(74) Attorney, Agent, or Firm — Ryan, Mason & Lewis, LLP

(57) ABSTRACT

Methods, apparatus, and processor-readable storage media for implementing a decentralized framework for providing application programming interface gateways are described herein. An example computer-implemented method includes: determining a set of characteristics for one or more application programming interface gateways based at least in part on information characterizing one or more user inputs of at least one user; identifying a plurality of application programming interface gateways based at least in part on the set of characteristics; selecting one or more of the plurality of identified application programming interface gateways based at least in part on one or more selection criteria; and causing the selected one or more application programming interface gateways to be configured for the at least one user based at least in part on configuration data corresponding to the selected one or more application programming interface gateways.

20 Claims, 7 Drawing Sheets

DECENTRALIZED FRAMEWORK FOR PROVIDING APPLICATION PROGRAMMING INTERFACE GATEWAYS

FIELD

The field relates generally to information processing systems, and more particularly to application programming interface (API) gateways associated with such systems.

BACKGROUND

API gateways are generally used to securely manage and expose APIs to users. It may be difficult with existing techniques to configure and manage such gateways.

SUMMARY

Illustrative embodiments of the disclosure relate to techniques for implementing a decentralized framework for providing API gateways. An exemplary computer-implemented method includes determining a set of characteristics for one or more API gateways based at least in part on information characterizing one or more user inputs of at least one user; identifying a plurality of API gateways based at least in part on the set of characteristics, wherein at least a first one of the plurality of API gateways is implemented using at least one different computing device than at least a second one of the plurality of API gateways; selecting one or more of the plurality of identified API gateways based at least in part on one or more selection criteria; and causing the selected one or more API gateways to be configured for the at least one user based at least in part on configuration data corresponding to the selected one or more API gateways.

Illustrative embodiments can provide significant advantages relative to conventional API gateway management techniques. For example, one or more technical challenges associated with managing API gateways are overcome in one or more embodiments by implementing a decentralized API gateway framework that allows developers to efficiently provision and manage API gateways, and also automatically addresses issues associated with such API gateways by reconfiguring API traffic without impacting users.

These and other illustrative embodiments described herein include, without limitation, methods, apparatus, systems, and computer program products comprising processor-readable storage media.

DETAILED DESCRIPTION

Figure 1:
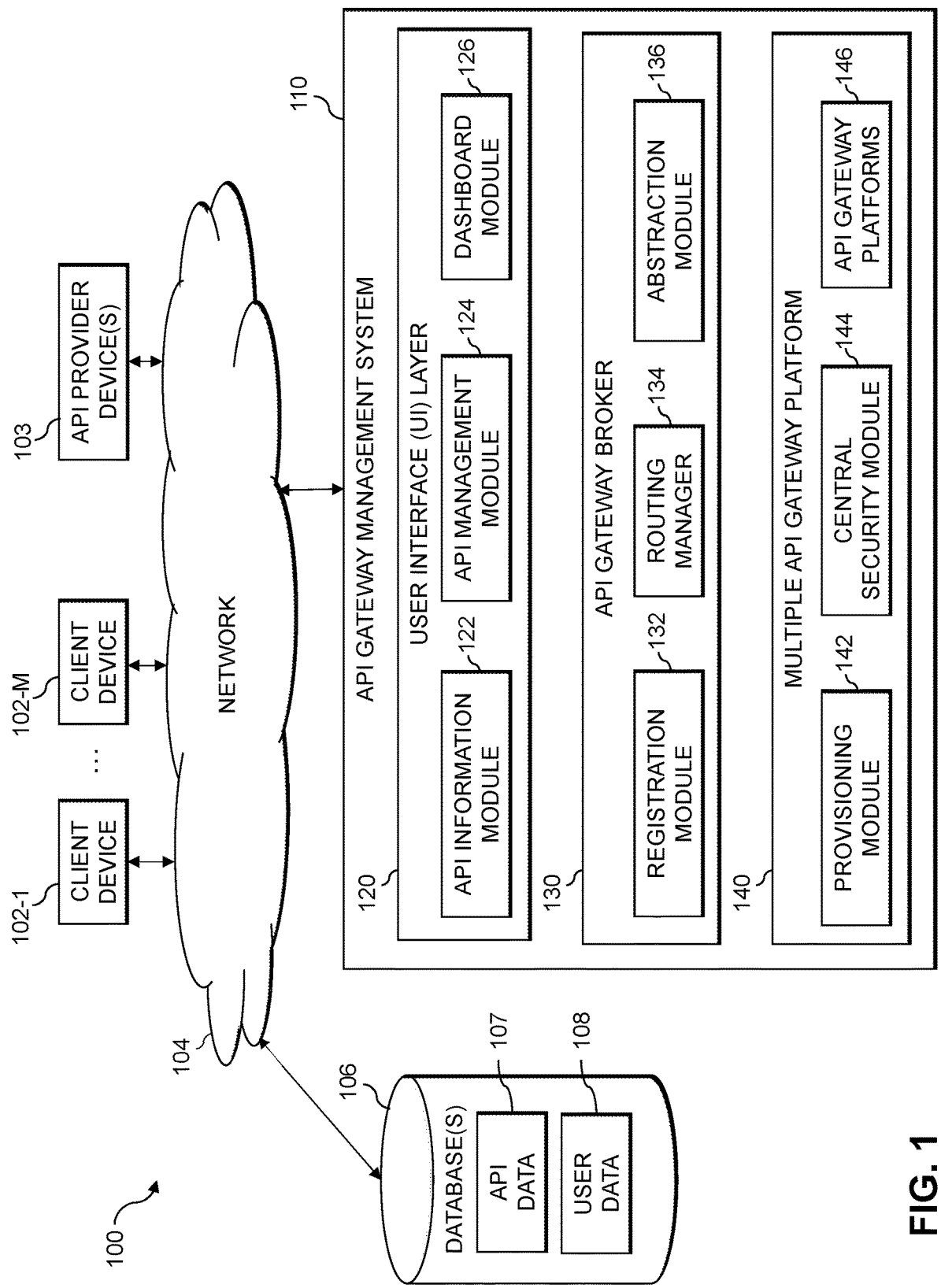
FIG. 1 shows an information processing system configured for implementing a decentralized framework for providing API gateways in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

As used herein, an API generally refers to a mechanism that enables communications between software components using a set of definitions and/or protocols. APIs permit programmers to write software applications consistent with an operating environment or website, for example.

As used herein, an "API gateway" generally refers to a software component or tool that is used as an entry point for client requests into a system with a plurality of applications or microservices having multiple distinct APIs. Requests from client devices are routed through an API gateway before being transmitted to the appropriate application or microservice. An API gateway provides protocol translations, if needed, to facilitate the interfacing of client devices with applications corresponding to different API protocols.

As noted above, API gateways are often implemented in a centralized manner, where a given developer is required to select a centralized API gateway for their APIs using a developer portal. This process typically requires developers to submit a form for registering their APIs, which is manually performed by an API gateway administrator. Developers typically do not have the capability to select an API gateway that is different than the designated centralized API gateway.

The increasing popularity of microservices and micro frontends have introduced challenges for existing centralized API gateways. If the centralized API gateway experiences an outage or downtime, then all of the APIs and microservices also can become unreachable. Accordingly, the centralized API gateway is a single point of failure. Although some disaster recovery and failover capabilities exist, developers still do not have the self-service capabilities to publish their APIs or to provide their own API gateways. Existing API gateways also lack multitenancy capabilities for segregating APIs (e.g., based on security regulations), as well as capabilities for inter-data center replication and for exposing health and state information. Current systems are also inefficient for users to interact with as they lack the ability to perform an action based on user behavior (e.g., a developer may be asked the same set of approval questions each time the developer wants to perform a particular task). Centralized API gateways also typically do not automatically scale based on usage (e.g., gateway resources cannot be automatically reconfigured to account for differences in usage for seasons, holidays, etc.), and may also lack capacity and workload management.

Illustrative embodiments described herein provide an API gateway framework that allows developers to choose different gateways based on their respective needs. In some embodiments, the framework provides self-service capabilities for developers to automatically expose, monitor, and/or manage APIs. If needed, a given developer can also register their own decentralized API gateway with the framework, thereby bringing the APIs closer to end users.

FIG. 1 shows an information processing system configured for implementing a decentralized framework for API gateways in an illustrative embodiment. The information processing system 100 comprises client devices 102-1, . . . 102-M (collectively "client devices 102"). The information processing system 100 further comprises one or more API provider devices 103. The client devices 102 and API provider devices 103 communicate over a network 104 with an API gateway management system 110.

The client devices 102 and API provider devices 103 can comprise, for example, Internet of Things (IoT) devices, desktop, laptop or tablet computers, mobile telephones, or other types of processing devices capable of communicating with the API gateway management system 110 over the network 104. Such devices are examples of what are more generally referred to herein as "processing devices." Some of these processing devices are also generally referred to herein as "computers."

The client devices 102 And API provider devices 103 may comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the terms "client," "provider," and "user" in this context and elsewhere herein are intended to be broadly construed so as to encompass numerous arrangements of human, hardware, software or firmware entities, as well as combinations of such entities. At least a portion of the available services and functionalities provided by the API gateway management system 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the API gateway management system 110, as well as to support communication between the API gateway management system 110 and connected devices (e.g., client devices 102 and API provider devices 103) and/or other related systems and devices not explicitly shown.

Additionally, the API gateway management system 110, the client devices 102, and/or the API provider devices 103 can have at least one associated database 106 configured to store API data 107 pertaining to metrics, documentation, reports, usage information for one or more APIs associated with one or more API gateways. In some embodiments, the least one associated database 106 is also configured to store user data 108 including, for example, user roles, members, and/or subscriptions associated with one or more APIs.

An example database 106, such as depicted in the present embodiment, can be implemented using one or more storage systems associated with API gateway management system 110, the client devices 102, and/or the API provider devices 103. Such storage systems can comprise any of a variety of different types of storage including network-attached storage (NAS), storage area networks (SANs), direct-attached storage (DAS) and distributed DAS, as well as combinations of these and other storage types, including software-defined storage.

In some embodiments, the client devices 102 and API provider devices 103 are assumed to be associated with repair technicians, system administrators, information technology (IT) managers, software developers or other authorized personnel configured to access and utilize the API gateway management system 110.

The API gateway management system 110 in the present embodiment is assumed to be accessible to the client devices 102 and API provider devices 103 over the network 104. The network 104 is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a Wi-Fi or WiMAX network, or various portions or combinations of these and other types of networks. The information processing system 100 in some embodiments therefore comprises combinations of multiple different types of networks, each comprising processing devices configured to communicate using internet protocol (IP) or other related communication protocols.

Generally, the API gateway management system 110 allows developers (e.g., associated with the client devices 102, and/or the API provider devices 103) to select different gateways based on their respective needs. The API gateway management system 110, in some embodiments, can automatically expose, monitor, and/or manage the API gateway selected by the developers. The API gateway management system 110 can provide developers with self-service capabilities to manage their respective API gateways, and also the ability to register their own gateway with the API gateway management system 110, as described in more detail elsewhere herein.

The API gateway management system 110 in the FIG. 1 example includes a user interface (UI) layer 120, an API gateway broker 130, and a multiple API gateway platform 140. In the FIG. 1 example, the UI layer 120 generally provides an interactive interface that can be used to explore, provision, and manage API gateways. In the FIG. 1 example, the UI layer 120 includes an API information module 122 for enabling users to find APIs and related documents based on, for example, one or more products, subcategories, and/or API access types. The UI layer 120 also includes an API management module 124 that provides an interface for developers to perform one or more actions for managing one or more API gateways, including actions for managing teams, user roles, APIs (e.g., publish, edit, delete, and/or promote a given API to production), subscriptions (e.g., create, edit, delete, and rotate API keys), and/or other activities such as task management and approvals for team APIs and subscriptions. The UI layer 120, in some embodiments, includes a dashboard module 126 that allows users to retrieve and view API metrics, API traffic information, API maturity reports, and/or subscription usage statistics associated with one or more APIs, for example. For example, the dashboard module 126 may display the following information for one or more APIs: number of requests, peak volume, request latency, response time, subscriptions count, subscription expiry, and/or capacity usage.

Also, in one or more embodiments, the UI layer 120 can obtain information characterizing one or more inputs from a given developer and can output one or more API gateway recommendations, and information related to such recommendations such as plans and prescribed tenants. For example, one or more API gateways can be recommended and/or automatically provisioned using a decision tree that is based on answers to one or more questions and/or constraints that are provided as user inputs. By way of example, the questions can ask the user about the type of API gateway that is needed (e.g., an enterprise version or an open-source version) and about historical and/or anticipated usage information (e.g., traffic information, number of users, throughput requirements, etc.). The decision tree can help guide the user by processing the answers to these questions. In some embodiments, the decision tree can be dynamically updated based on developer statistics, API gateway statistics (e.g., corresponding to capacity), API usage information associated with one or more API gateways, or user feedback regarding one or more of the API gateway recommendations.

As used herein, the term "decision tree" shall be broadly construed to encompass additional computer-implemented mechanisms for evaluating possible outcomes (such as identifying or selecting one or more API gateways from among multiple possible API gateways) based at least in part on user selections, specifications and/or decisions, or that otherwise allow possible API gateway options to be evaluated by a user against other API gateway options, as would be apparent to a person of ordinary skill in the art.

Additionally, the UI layer 120 can collect data related to API usage and customer behavior to enhance the user interface. Such data can be used to predict user behavior to improve the efficiency of certain actions. For example, if the data indicates that a given developer has been approved to perform a certain task (e.g., publishing or subscribing to an API), then there is no need to initiate an approval process each time that task is performed.

The API gateway broker 130 includes a registration module 132, a routing manager 134, and an abstraction module 136. In some embodiments, the registration module 132 provides functionality for registering API gateway platforms 146 associated with the multiple API gateway platform 140. The registration module 132 may also generate and store API gateway templates associated with the API gateway platforms 146. The templates can be stored, for example, in the at least one database 106 as part of API data 107. In some embodiments, the gateway templates may include one or more open-source templates, one or more enterprise templates, and/or other gateway templates (e.g., corresponding to different performance tiers, such as a gold template, a silver template, and bronze template). In some embodiments, each template can include corresponding configuration data related to one or more of: rate-limiting, security, caching, authentication, authorization, Transport Layer Security (TLS) termination, and/or the like.

The routing manager 134 collects information related to the APIs, such as API metadata and behavior related to one or more APIs and can make recommendations for API gateways as part of an onboarding process of a user. Additionally, the routing manager 134 can also implement "circuit-breaker" functionality for routing (or re-routing) API traffic based on state information related to whether the respective API gateway platforms 146 are reachable. In such embodiments, the routing manager 134 can automatically trigger API traffic to be routed to a different API gateway in response to changes in the state information. By way of example, the routing manager 134 can periodically send signals (e.g., every five seconds) to test the availability of the platforms. If the routing manager 134 detects that a first API gateway becomes unavailable, then the API traffic corresponding to the first API gateway can be automatically routed to a second API gateway at least until the first API gateway becomes available again. In such an example, the first and the second API gateways are assumed to have similar configurations so that the user requirements are met (e.g., if the first API gateway corresponds to a "bronze" gateway template, then the second API gateway should also be at least a "bronze" configuration). Accordingly, the API gateway broker 130 can automatically handle API gateway issues by directing API traffic to alternate API gateways without impacting API consumers (e.g., corresponding to client devices 102).

The abstraction module 136 can abstract different tenants and/or gateway complexities, and can generate gateway characteristics specific to at least one of the API gateway platforms 146 by transforming generic gateway characteristics received from the UI layer 120 that were determined based on user inputs for a given developer. For example, a set of generic characteristics can be determined based on the responses received from the user from the UI layer 120, and the abstraction module 136 can identify at least one gateway that has a set of specific characteristics corresponding to the generic characteristics. As an example, the set of general characteristics for a given user may indicate that an open-source API gateway with low throughput requirements is needed. In such an example, the abstraction module 136 can identify at least one open-source API gateway that satisfies the throughput requirements (out of potentially a plurality of open-source API gateways), and then determine the specific set of gateway characteristics for that API gateway.

The multiple API gateway platform 140 includes a provisioning module 142, a central security module 144, and a plurality of API gateway platforms 146. The provisioning module 142 automatically provisions one or more API gateways on one or more of the API gateway platforms 146. In some embodiments, the provisioning module 142 may provision the API gateways across different data centers (e.g., associated with API gateway management system 110 and/or one or more other data centers not explicitly shown in FIG. 1) based on user demand. In some embodiments, the provisioning module 142 can automatically initiate a request to provision, decommission, and/or edit one or more gateways in response to one or more user inputs with the UI layer 120, for example.

The central security module 144, in some embodiments, allows gateway administrators to manage centralized security policies related to one or more of the API gateway platforms 146, while allowing developers to manage respective local security policies. To achieve this, the multiple API gateway platform 140 can create a cluster of one or more API gateways (e.g., based on user requirements) and automatically provision the gateways, as described in more detail in conjunction with FIG. 2, for example. It is to be appreciated that the cluster of gateways can include a single API gateway or multiple API gateways (e.g., to increase availability). Accordingly, the central security module 144 can enable "zero trust" security, while allowing decentralized local security policies that can be controlled by users.

Although shown as elements of the API gateway management system 110, the UI layer 120, the API gateway broker 130, and/or the multiple API gateway platform 140 can be implemented at least in part externally to the API gateway management system 110, for example, as stand-alone servers, sets of servers or other types of systems coupled to the network 104. For example, the UI layer 120, the API gateway broker 130, and/or the multiple API gateway platform 140 may be provided as cloud services accessible by the API gateway management system 110.

The UI layer 120, the API gateway broker 130, and/or the multiple API gateway platform 140 in the FIG. 1 embodiment are each assumed to be implemented using at least one processing device. Each such processing device generally comprises at least one processor and an associated memory, and implements one or more functional modules for controlling certain features of the UI layer 120, the API gateway broker 130, and/or the multiple API gateway platform 140.

At least portions of the API gateway management system 110 and the components thereof may be implemented at least in part in the form of software that is stored in memory and executed by a processor. The API gateway management system 110 and the components thereof comprise further hardware and software required for running the API gateway management system 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Additionally, although the UI layer 120, the API gateway broker 130, the multiple API gateway platform 140 and other components of the API gateway management system 110 in the present embodiment are shown as part of the API gateway management system 110, at least a portion of the UI layer 120, the API gateway broker 130, and/or the multiple API gateway platform 140 and other components of the API gateway management system 110 in other embodiments may be implemented on one or more other processing platforms that are accessible to the API gateway management system 110 over one or more networks. Such components can each be implemented at least in part within another system element or at least in part utilizing one or more stand-alone components coupled to the network 104.

It is assumed that the API gateway management system 110 in the FIG. 1 embodiment and other processing platforms referred to herein are each implemented using a plurality of processing devices each having a processor coupled to a memory.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The term "processing platform" as used herein is intended to be broadly construed so as to encompass, by way of illustration and without limitation, multiple sets of processing devices and one or more associated storage systems that are configured to communicate over one or more networks.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the API gateway management system 110 to reside in different data centers. Numerous other distributed implementations of the API gateway management system 110 are possible.

Accordingly, one or each of the UI layer 120, the API gateway broker 130, and/or the multiple API gateway platform 140 and other components of the API gateway management system 110 can each be implemented in a distributed manner so as to comprise a plurality of distributed components implemented on respective ones of a plurality of compute nodes of the API gateway management system 110.

It is to be appreciated that these and other features of illustrative embodiments are presented by way of example only, and should not be construed as limiting in any way.

Accordingly, different numbers, types and arrangements of system components such as the UI layer 120, the API gateway broker 130, and/or the multiple API gateway platform 140 and other components of the API gateway management system 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
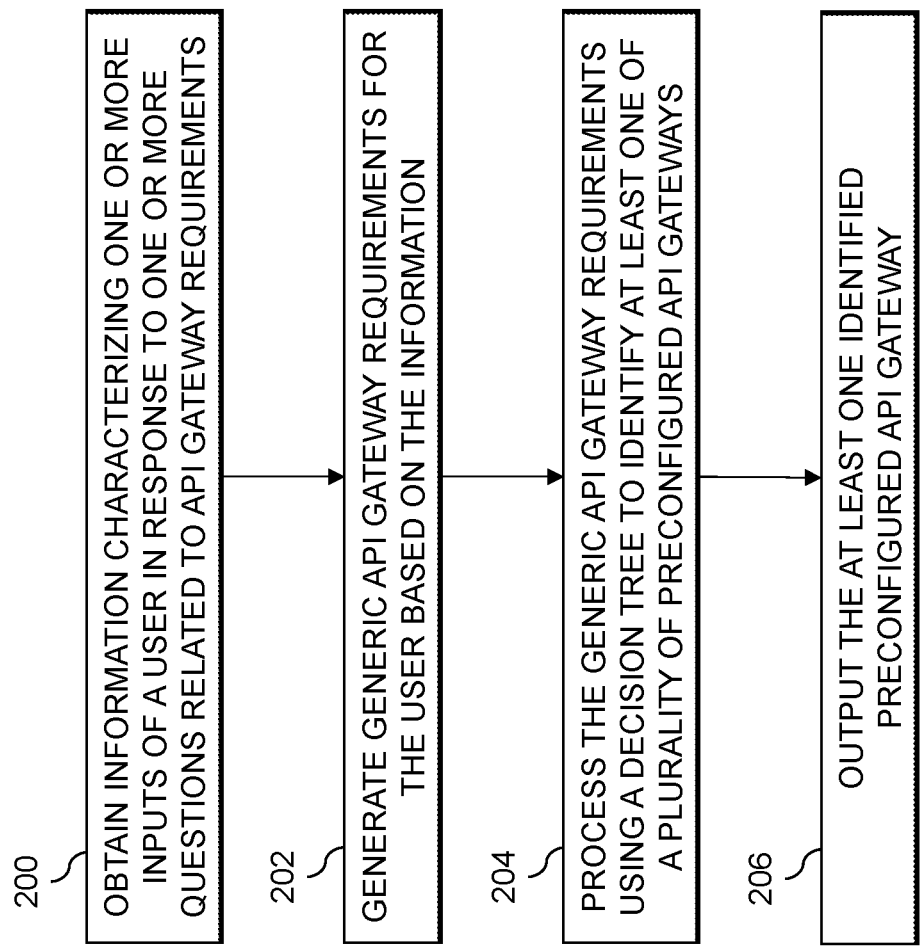
FIG. 2 shows a flow diagram of a process for identifying an API gateway based on user inputs in an illustrative embodiment.

FIG. 2 shows a flow diagram of a process for identifying an API gateway based on user inputs in an illustrative embodiment. It is to be understood that this particular process is only an example, and additional or alternative processes can be carried out in other embodiments.

Step 200 includes obtaining information characterizing one or more inputs of a user in response to one or more questions related to API gateway requirements. For example, the questions can include questions related to performance requirements, licensing requirements, geographic locations, technology types of API gateways, and/or the like.

Step 202 includes generating generic API gateway requirements for the user based on the information obtained at step 200.

Step 204 includes processing the generic API requirements using a decision tree to identify at least one of a plurality of preconfigured API gateways. For example, consider a situation where the generic requirements indicate that the user needs an enterprise version API gateway with a high throughput (e.g., above some threshold throughput value). In such an example, the decision tree can be traversed to identify a set of preconfigured API gateways that are enterprise versions, and then identify a subset of the preconfigured API gateways having a high throughput. If the user indicated a particular geographic location, then this information can be used to identify the preconfigured API gateways that are closest to that location, for example. Accordingly, step 204 can be based on the decision tree and specific requirements corresponding to each of the plurality of preconfigured API gateways that is maintained by the API gateway management system 110, for example.

Step 206 includes outputting the at least one identified API gateway. For example, step 206 can output the at least one identified preconfigured API gateway to the user, or can automatically provision (e.g., using provisioning module 142) the at least one API gateway for the user.

In some embodiments, the user inputs can also specify particular time periods (e.g., days, months, seasons, etc.) in order to automatically scale API gateways accordingly, based on usage.

Figure 3:
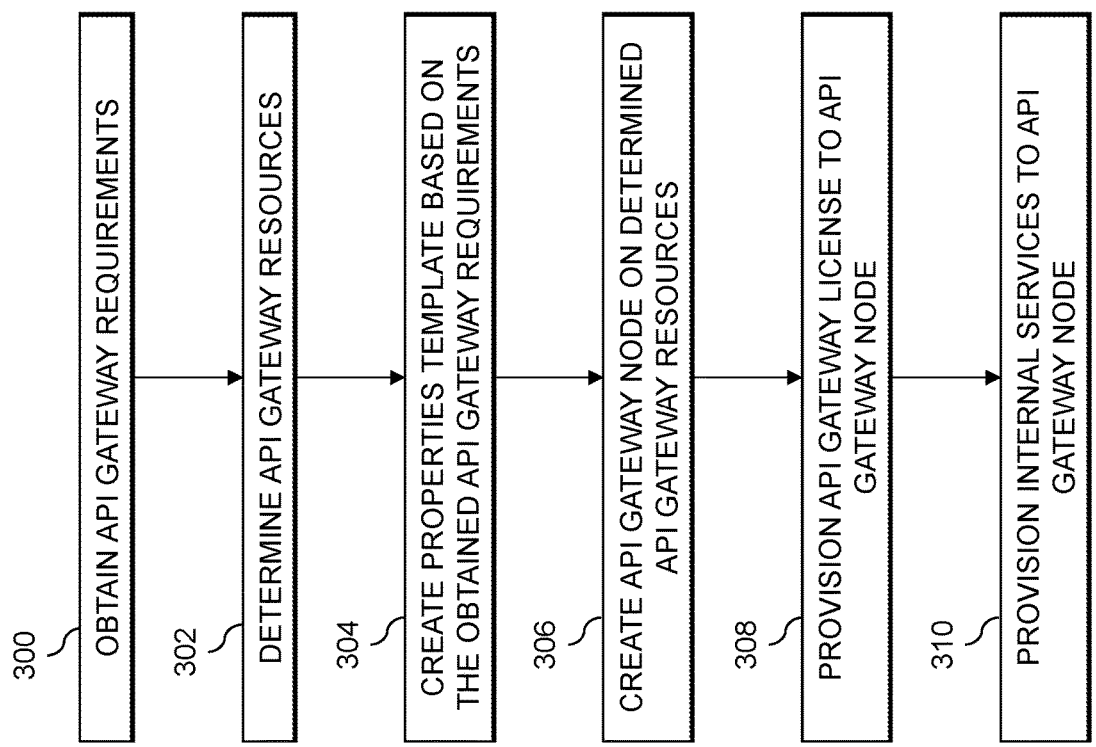
FIG. 3 shows a flow diagram of a provisioning process in an illustrative embodiment.

FIG. 3 shows a flow diagram of a provisioning process in an illustrative embodiment. It is to be understood that this particular process is only an example, and additional or alternative processes can be carried out in other embodiments.

In this embodiment, the process includes steps 300 through 310. These steps are assumed to be performed by the multiple API gateway platform 140.

Step 300 includes obtaining API gateway requirements. For example, the API gateway requirements can be obtained as described in the process depicted in FIG. 2.

Step 302 includes determining API gateway resources to be used for the API gateway. For example, step 302 may include collecting information related to user demand and/or capacity of resources associated with a plurality of data centers, and then determining the resources to be used for the API gateway based on such information.

Step 304 includes creating a properties template based on the obtained API gateway requirements. The properties template generally refers to a file where properties or parameters for configuring the API gateway can be defined. Such properties can include, for example, host information, administrator account information, database information, and cluster information relevant to the API gateway.

Step 306 includes creating an API gateway node on the API gateway resources determined in step 302. In some embodiments, the API gateway node is created by executing a script or command that applies the properties from the properties template created in step 304.

Step 308 includes provisioning an API gateway license, for one or more developers, to the API gateway node that was created in step 306. The API gateway license generally corresponds to a file that unlocks the functionality of the API gateway. Step 308 may include, for example, installing the API gateway license in a directory of the API gateway, changing permissions and/or owners associated with the API gateway license and/or directory, and restarting the API gateway.

Step 310 includes provisioning internal services to the API gateway node. An internal service generally refers to a published service defined within the API gateway. Examples of internal services include API gateway management services, security token services, metric services, and subscription services.

It is to be appreciated that, in some embodiments, the process shown in FIG. 3 can depend on the obtained API gateway requirements of the user and/or the type of API gateway technology (such as Layer 7, NGNIX, and Kong). Thus, in some embodiments, the processes can be adapted based on the API gateway technology being used.

At least some embodiments described herein enable developers to build developer-centric API gateways with decentralization and service mesh. Developers are provided capabilities to implement and manage their own API gateways in an automated manner. Such embodiments can be vendor-agnostic and can implement multiple types of API gateways using different types of API gateway technologies. Also, developers can implement API gateways on resources that are closer to users (e.g., at the cloud edge), thereby resulting in faster response times relative to a centralized API gateway. Such embodiments can also improve the efficiency of onboarding APIs, and provide improved operability by separating infrastructure by organizations, for example.

Figure 4:
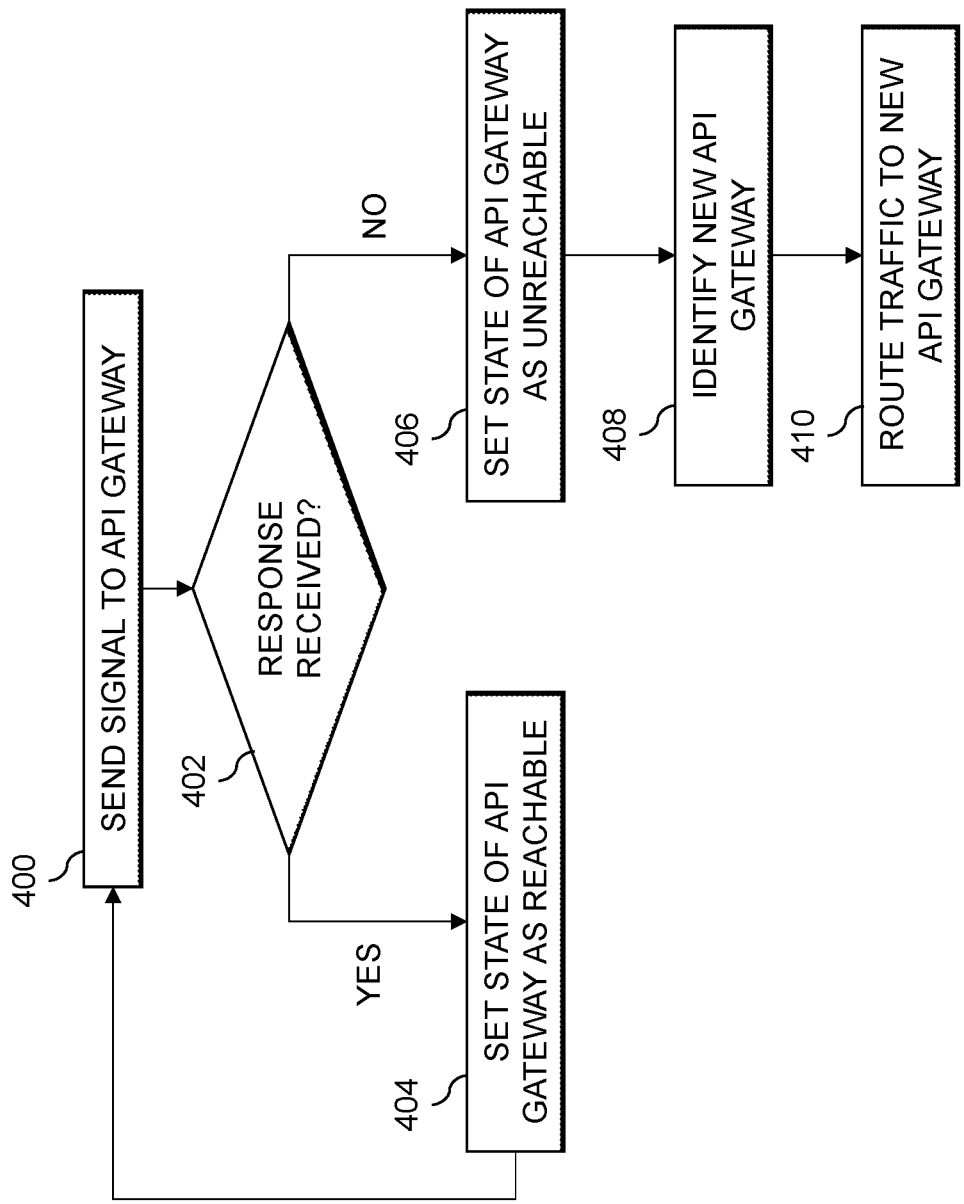
FIG. 4 shows a flow diagram of a process for automatically routing API traffic in accordance with an illustrative embodiment.

FIG. 4 shows a flow diagram of a process for automatically routing API traffic in accordance with an illustrative embodiment.

Step 400 includes sending a signal to an API gateway to detect whether the API gateway is reachable. The signal in some embodiments can be sent periodically (e.g., every five seconds) to test the availability of the platforms.

Step 402 includes a test to determine whether a response to the signal was received. If yes, then the process continues to step 404, which includes setting the state of the API gateway as reachable. If no, then the process continues to step 406, which includes setting the state of the API gateway as unreachable. It is noted that the state of the API gateway, in some embodiments, can be maintained (e.g., by the API gateway management system 110) in the form of a Boolean parameter, where a first value indicates that the state is reachable and a second value indicates that the state is unreachable.

Step 408 is performed in response to performance of step 406 and includes identifying a new API gateway to replace the unreachable API gateway. The new API gateway, in some embodiments, is assumed to have characteristics that allow the new API gateway to perform in a manner that is substantially similar to the unreachable API gateway. In this regard, at least some of the characteristics of the new API gateway can be different (e.g., a different API gateway technology), or at least some of the characteristics can be superior or within a predefined range (e.g., API throughput). The new API gateway can be identified using the process in FIG. 2, for example. Step 410 includes routing API traffic to the new API gateway.

In some embodiments, the process can continue sending signals to the unreachable API gateway, and if it becomes reachable, the process can route the API traffic back to the unreachable API gateway.

Figure 5:
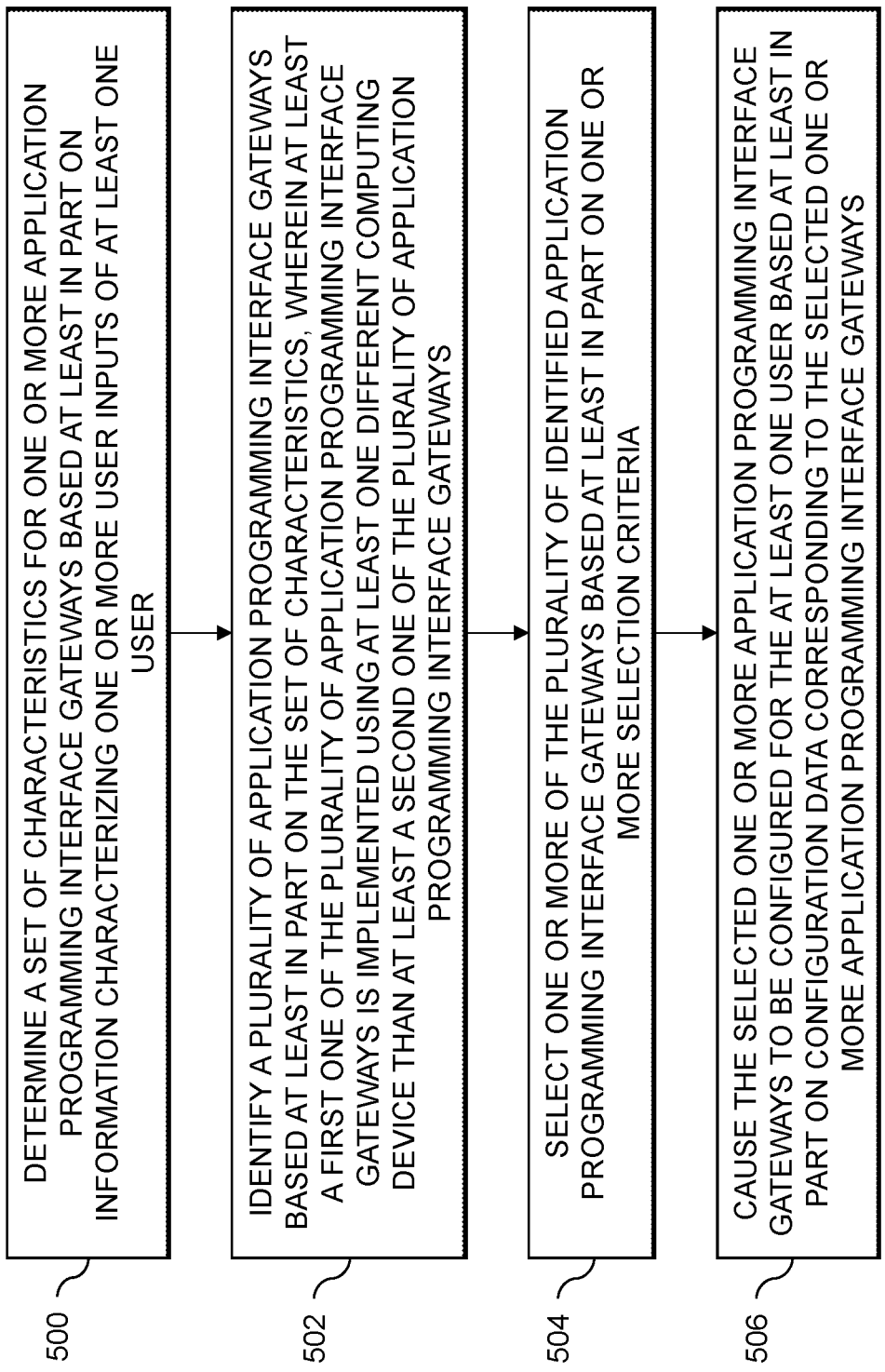
FIG. 5 shows a flow diagram of a process for implementing a decentralized framework for providing API gateways in an illustrative embodiment.

FIG. 5 is a flow diagram of a process for implementing a decentralized framework for providing API gateways in an illustrative embodiment. It is to be understood that this particular process is only an example, and additional or alternative processes can be carried out in other embodiments.

In this embodiment, the process includes steps 500 through 506. These steps are assumed to be performed by the API gateway management system 110 utilizing at least a portion of its elements 120, 130, and 140.

Step 500 includes determining a set of characteristics for one or more API gateways based at least in part on information characterizing one or more user inputs of at least one user.

Step 502 includes identifying a plurality of API gateways based at least in part on the set of characteristics, wherein at least a first one of the plurality of API gateways is implemented using at least one different computing device than at least a second one of the plurality of API gateways.

Step 504 includes selecting one or more of the plurality of identified API gateways based at least in part on one or more selection criteria. Step 506 includes causing the selected one or more API gateways to be configured for the at least one user based at least in part on configuration data corresponding to the selected one or more API gateways.

The process may further include periodically sending one or more signals to monitor an availability of the one or more configured API gateways; and in response to determining that at least one of the one or more configured API gateways is unavailable, automatically causing one or more transactions from one or more client devices to the at least one of the one or more configured API gateways to be routed to at least another one of the plurality of API gateways. The causing the selected one or more API gateways to be configured may include: configuring at least two of the selected API gateways across two or more data centers. The set of characteristics may include at least one of: one or more performance characteristics, one or more security characteristics, one or more geographic locations, and one or more licensing characteristics; and the plurality of API gateways is identified by processing the set of characteristics based at least in part on a decision tree. The process may include updating the decision tree based at least in part on usage data associated with the plurality of API gateways. The process may include maintaining and enforcing: at least one global security policy for the plurality of API gateways; and at least one security policy of the at least one user for the one or more configured API gateways. The configuration data may be based at least in part on a respective technology type of each of the selected one or more API gateways. The process may include causing information corresponding to at least a portion of the configured one or more API gateways to be rendered using an interactive user interface associated with the at least one user, wherein the information comprises at least one of: usage statistics, user information, and API behavior information. The process may include: triggering at least one action in response to one or more additional user inputs from the at least one user with an interactive user interface, wherein the at least one action comprises adjusting at least one of: one or more user roles associated with at least one API associated with the configured one or more API gateways; one or more subscriptions associated with at least one API associated with the configured one or more API gateways; and at least one configuration of the configured one or more API gateways. The one or more selection criteria may be based at least in part on at least one of: geographic locations associated with the plurality of API gateways and resource capacity information associated with the plurality of API gateways. The selecting may be further based on one or more additional user inputs received from the at least one user in response to outputting information corresponding to at least a portion of the plurality of API gateway to the at least one user.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve API gateway techniques by implementing a decentralized API gateway framework that allows developers to efficiently provision and manage API gateways, and also automatically address issues associated with such API gateways by reconfiguring API traffic without impacting users. These and other embodiments can effectively overcome problems associated with existing centralized API gateway techniques that are susceptible to failures, lack flexibility, and are difficult to manage.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
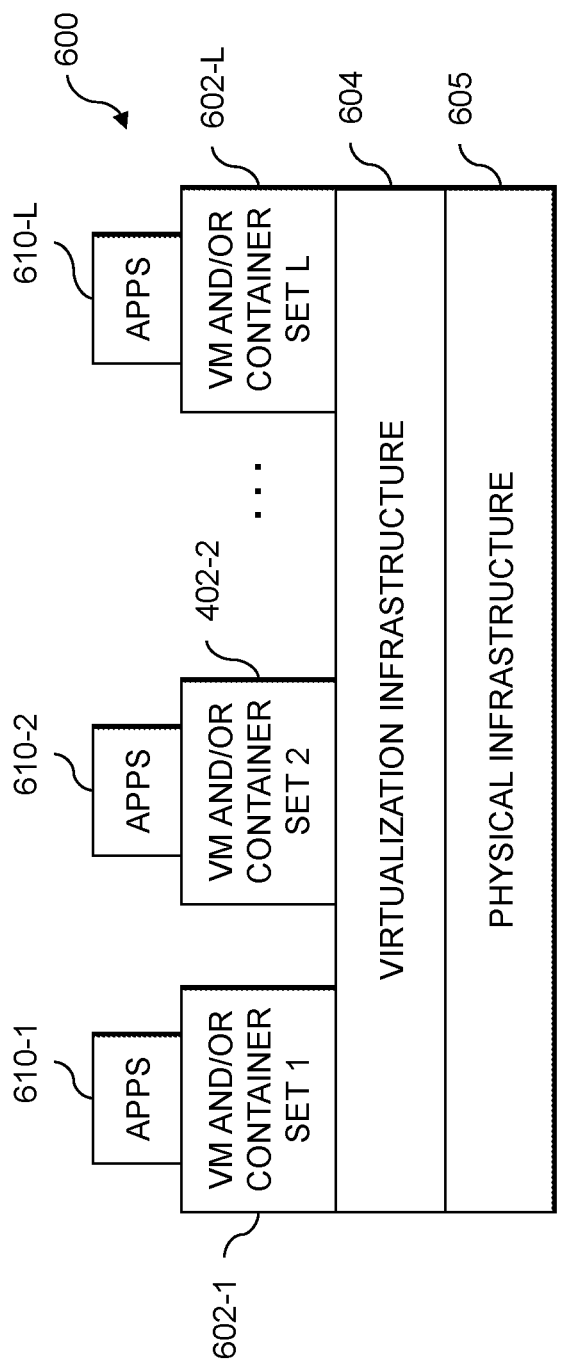
FIGS. 6 and 7 show examples of processing platforms that may be utilized to implement at least a portion of an information processing system in illustrative embodiments.
Figure 7:
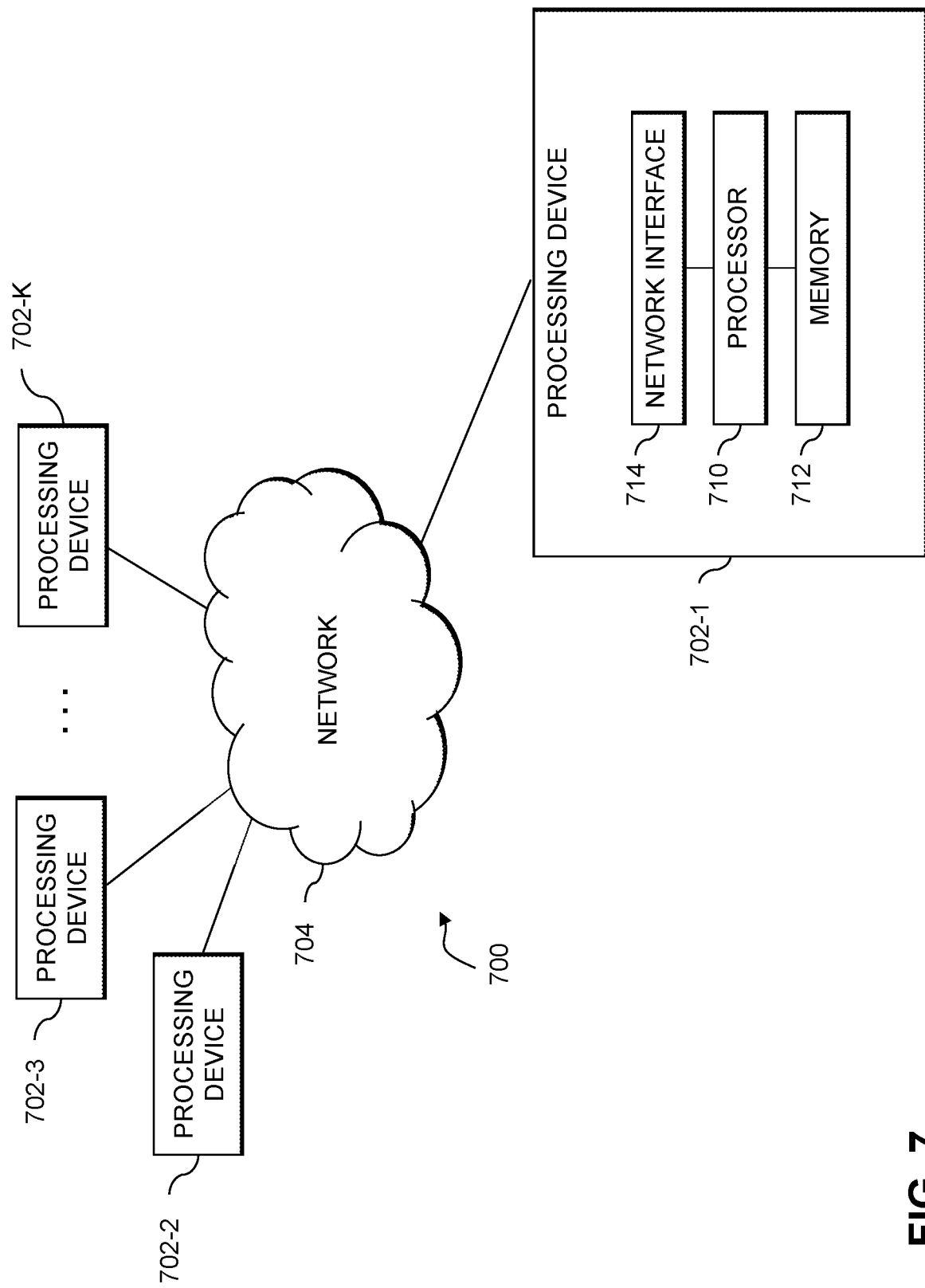

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA or other type of processing circuitry, as well as portions or combinations of such circuitry elements.

The memory 712 comprises RAM, ROM or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    determining a set of characteristics for one or more application programming interface gateways based at least in part on information characterizing one or more user inputs of at least one user;
    identifying a plurality of application programming interface gateways based at least in part on the set of characteristics, wherein at least a first one of the plurality of application programming interface gateways is implemented using at least one different computing device than at least a second one of the plurality of application programming interface gateways;
    selecting one or more of the plurality of identified application programming interface gateways based at least in part on one or more selection criteria;
    causing the selected one or more application programming interface gateways to be configured for the at least one user based at least in part on configuration data corresponding to the selected one or more application programming interface gateways; and
    in response to determining that at least one of the configured one or more application programming interface gateways is unavailable, automatically causing one or more transactions from one or more client devices to the at least one of the configured one or more application programming interface gateways to be routed to at least another one of the plurality of application programming interface gateways;
    wherein the method is performed by at least one processing device comprising a processor coupled to a memory.

2. The computer-implemented method of claim 1, comprising:
    periodically sending one or more signals to monitor an availability of the configured one or more application programming interface gateways, wherein the determining that the at least one of the configured one or more application programming interface gateways is unavailable is based at least in part on the one or more signals.

3. The computer-implemented method of claim 1, wherein the causing the selected one or more application programming interface gateways to be configured comprises:
    configuring at least two of the selected one or more application programming interface gateways across two or more data centers.

4. The computer-implemented method of claim 1, wherein:
    the set of characteristics comprises at least one of: one or more performance characteristics, one or more security characteristics, one or more geographic locations, and one or more licensing characteristics; and
    the plurality of application programming interface gateways is identified by processing the set of characteristics based at least in part on a decision tree.

5. The computer-implemented method of claim 4, comprising:
    updating the decision tree based at least in part on usage data associated with the plurality of application programming interface gateways.

6. The computer-implemented method of claim 1, comprising maintaining and enforcing:
    at least one global security policy for the plurality of application programming interface gateways; and
    at least one security policy of the at least one user for the configured one or more application programming interface gateways.

7. The computer-implemented method of claim 1, wherein the configuration data is based at least in part on a respective technology type of each of the selected one or more application programming interface gateways.

8. The computer-implemented method of claim 1, comprising:
    causing information corresponding to at least a portion of the configured one or more application programming interface gateways to be rendered using an interactive user interface associated with the at least one user, wherein the information comprises at least one of: usage statistics, user information, and application programming interface behavior information.

9. The computer-implemented method of claim 1, comprising:
    triggering at least one action in response to one or more additional user inputs from the at least one user with an interactive user interface, wherein the at least one action comprises adjusting at least one of: one or more user roles associated with at least one application programming interface associated with the configured one or more application programming interface gateways; one or more subscriptions associated with at least one application programming interface associated with the configured one or more application programming interface gateways; and at least one configuration of the configured one or more application programming interface gateways.

10. The computer-implemented method of claim 1, wherein the one or more selection criteria are based at least in part on at least one of: geographic locations associated with the plurality of application programming interface gateways and resource capacity information associated with the plurality of application programming interface gateways.

11. The computer-implemented method of claim 1, wherein the selecting is further based on one or more additional user inputs received from the at least one user in response to outputting information corresponding to at least a portion of the plurality of application programming interface gateways to the at least one user.

12. A non-transitory processor-readable storage medium having stored therein program code of one or more software programs, wherein the program code when executed by at least one processing device causes the at least one processing device:

to determine a set of characteristics for one or more application programming interface gateways based at least in part on information characterizing one or more user inputs of at least one user;

to identify a plurality of application programming interface gateways based at least in part on the set of characteristics, wherein at least a first one of the plurality of application programming interface gateways is implemented using at least one different computing device than at least a second one of the plurality of application programming interface gateways;

to select one or more of the plurality of identified application programming interface gateways based at least in part on one or more selection criteria;

to cause the selected one or more application programming interface gateways to be configured for the at least one user based at least in part on configuration data corresponding to the selected one or more application programming interface gateways; and in response to determining that at least one of the configured one or more application programming interface gateways is unavailable, automatically cause one or more transactions from one or more client devices to the at least one of the configured one or more application programming interface gateways to be routed to at least another one of the plurality of application programming interface gateways.

13. The non-transitory processor-readable storage medium of claim 12, wherein the program code causes the at least one processing device:

to periodically send one or more signals to monitor an availability of the configured one or more application programming interface gateways, wherein the determining that the at least one of the one or more configured application programming interface gateways is unavailable is based at least in part on the one or more signals.

14. The non-transitory processor-readable storage medium of claim 12, wherein the causing the selected one or more application programming interface gateways to be configured comprises:

configuring at least two of the selected one or more application programming interface gateways across two or more data centers.

15. The non-transitory processor-readable storage medium of claim 12, wherein:

the set of characteristics comprises at least one of: one or more performance characteristics, one or more security characteristics, one or more geographic locations, and one or more licensing characteristics; and the plurality of application programming interface gateways is identified by processing the set of characteristics based at least in part on a decision tree.

16. The non-transitory processor-readable storage medium of claim 12, wherein the program code causes the at least one processing device to maintain and to enforce:

at least one global security policy for the plurality of application programming interface gateways; and at least one security policy of the at least one user for the configured one or more application programming interface gateways.

17. An apparatus comprising:

at least one processing device comprising a processor coupled to a memory;

the at least one processing device being configured:

to determine a set of characteristics for one or more application programming interface gateways based at least in part on information characterizing one or more user inputs of at least one user;

to identify a plurality of application programming interface gateways based at least in part on the set of characteristics, wherein at least a first one of the plurality of application programming interface gateways is implemented using at least one different computing device than at least a second one of the plurality of application programming interface gateways;

to select one or more of the plurality of identified application programming interface gateways based at least in part on one or more selection criteria;

to cause the selected one or more application programming interface gateways to be configured for the at least one user based at least in part on configuration data corresponding to the selected one or more application programming interface gateways; and in response to determining that at least one of the configured one or more application programming interface gateways is unavailable, automatically cause one or more transactions from one or more client devices to the at least one of the configured one or more application programming interface gateways to be routed to at least another one of the plurality of application programming interface gateways.

18. The apparatus of claim 17, wherein the at least one processing device is configured:

to periodically send one or more signals to monitor an availability of the configured one or more application programming interface gateways.

19. The apparatus of claim 17, wherein the causing the selected one or more application programming interface gateways to be configured comprises:

configuring at least two of the selected one or more application programming interface gateways across two or more data centers.

20. The apparatus of claim 17, wherein:

the set of characteristics comprises at least one of: one or more performance characteristics, one or more security characteristics, one or more geographic locations, and one or more licensing characteristics; and the plurality of application programming interface gateways is identified by processing the set of characteristics based at least in part on a decision tree.

* * * * *

UNITED STATES PATENT AND TRADEMARK OFFICE
CERTIFICATE OF CORRECTION

PATENT NO. : 12,299,505 B2
APPLICATION NO. : 17/947535
DATED : May 13, 2025
INVENTOR(S) : Shailesh Sharma et al.

Page 1 of 1

It is certified that error appears in the above-identified patent and that said Letters Patent is hereby corrected as shown below:

In the Claims

Claim 13, Lines 34-35, the portion of the claim reading "the at least one of the one or more configured application programming interface gateways" should read --the at least one of the configured one or more application programming interface gateways--.

Signed and Sealed this
Eighth Day of July, 2025

Coke Morgan Stewart
*Acting Director of the United States Patent and Trademark Office*